United States Patent Office 2,766,238
Patented Oct. 9, 1956

2,766,238

AMINO COMPOUNDS HAVING ANTISPASMODIC PROPERTIES

Lloyd Crosser Felton, Cockeysville, Md., assignor to Hynson, Westcott & Dunning, Incorporated, a corporation of Maryland No Drawing. Application December 18, 1952, Serial No. 326,768

5 Claims. (Cl. 260—247.7)

This invention relates to compounds of the general formula

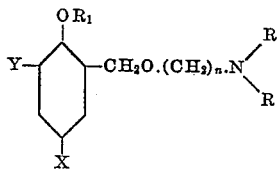

in which Y is hydrogen or a halogen, X is hydrogen, a lower alkyl group or a halogen, $R_1$ is an alkyl group having from 1 to 6 carbon atoms, each R stands for an alkyl group having from 1 to 4 carbon atoms or the two R's together stand for the group

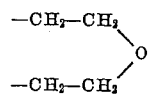

and $n$ is 2 or 3. The compounds in which X or Y is iodine tend to be unstable. For this reason chlorine and bromine are the preferred halogens.

The compounds generally have antispasmodic properties and some of them have been found to possess this property to a sufficient degree to be clinically useful.

Specific examples of such compounds are the following:

The compounds generally may be prepared by reacting the alkali metal salt of an amino alcohol of the formula

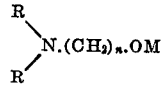

in which R and $n$ have the values noted above and M is an alkali metal, preferably sodium, with a compound of the general formula

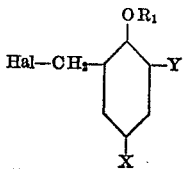

in which $R_1$ X and Y have the values noted above and Hal is a halogen. The alkali metal salt of the amino alcohol may be prepared by refluxing a solution of the corresponding amino alcohol in a suitable solvent such as xylene in the presence of an excess of the alkali metal. The excess or unconsumed alkali metal is separated from the resulting solution and the halogen derivative of the alkoxy halogen benzyl compound is added and the mixture refluxed. The resulting amino ether is extracted from the xylene solution with dilute aqueous hydrochloric acid, precipitated by neutralizing the hydrochloric solution with sodium hydroxide and is then purified by distillation under reduced pressure.

The following specific example of the preparation of the compound 5 of the above table is illustrative.

A mixture of 11.7 grams of diethylaminoethanol, 4 grams of sodium and 100 cc. of xylene is refluxed for 5 hours and the resulting solution separated from excess

| Number | $R_1$ | R | X | Y | $n$ | Boiling Point of the Amine | Melting Point of the Hydrochloride, degrees |
|---|---|---|---|---|---|---|---|
| 1 | —CH₃ | —C₂H₅ | —H | —H | 2 | 160–170°/5 mm | 102–105 |
| 2 | —CH₃ | —C₂H₅ | —CH₃ | —H | 2 | 160–167°/3 mm | 87–92 |
| 3 | —CH₃ | —C₂H₅ | —Cl | —H | 2 | 165–170°/3 mm | 120–123 |
| 4 | —CH₃ | —CH₃ | —Br | —H | 2 | 165–170°/5 mm | 104–107 |
| 5 | —CH₃ | —C₂H₅ | —Br | —H | 2 | 160–170°/5 mm | 115–117 |
| 6 | —CH₃ | —C₄H₉ | —Br | —H | 2 | 200–210°/5 mm | 133–140 |
| 7 | —CH₃ | —C₂H₅ | —Br | —Br | 2 | 185–195°/3 mm | 124–127 |
| 8 | —C₂H₅ | —C₂H₅ | —Br | —H | 2 | 185–190°/5 mm | 147–149 |
| 9 | —C₃H₇ | —C₂H₅ | —Br | —H | 2 | 185–195°/5 mm | 134–137 |
| 10 | —CH₂—CH=CH₂ | —C₂H₅ | —Br | —H | 2 | 185–190°/3 mm | 130–132 |
| 11 | —CH(CH₃)₂ | —C₂H₅ | —Br | —H | 2 | 180–190°/3 mm | 140–142 |
| 12 | —C₄H₉ (normal) | —C₂H₅ | —Br | —H | 2 | 190–200°/5 mm | 104–107 |
| 13 | —C₅H₁₁ (secondary) | —C₂H₅ | —Br | —H | 2 | 190–200°/5 mm | 80–82 |
| 14 | —C₆H₁₃ (normal) | —C₂H₅ | —Br | —H | 2 | 210–220°/5 mm | |
| 15 | —CH(CH₃)₂ | —C₄H₉ | —Br | —H | 2 | 215–225°/6 mm | 62–70 |
| 16 | —CH₃ | —CH₂—CH₂—O—CH₂—CH₂— | —Br | —H | 2 | 185–195°/5 mm | 162–167 |
| 17 | —CH₂—CH(CH₃)₂ | —C₂H₅ | —Br | —H | 3 | 190–205°/5 mm | 93–97 |
| 18 | —CH₃ | —C₂H₅ | —Cl | Cl | 2 | 167–175°/3 mm | 113–117 |
| 19 | —CH₃ | —C₄H₉ | —Br | —Br | 2 | 210–225°/3 mm | 70–75 | sodium. 28 grams of 2-methoxy-5-bromobenzyl bromide are then introduced into the solution and the resulting mixture is refluxed for 2 hours. The mixture is then filtered to separate sodium bromide. The filtrate is extracted with dilute aqueous hydrochloric acid solution, the resulting solution made alkaline by the addition of sodium hydroxide solution and then extracted with ethyl ether. The resulting ether solution is distilled first to remove the ether and then under vacuum to distill over the product. 26 grams of a product boiling within the range 190° C. to 200° C. at 5 mm. pressure is recovered. This product is dissolved in dry ether and dry HCl is passed through the ether solution to form the hydrochloride. The hydrochloride after purification by crystallization twice from a mixture of methanol and ether has a melting point of 115°–118° C.

All of the compounds are active antispasmodic agents when applied parenterally but so far as I have found only compounds 7, 18 and 19 are useful when applied by mouth. Their activity is demonstrated by their ability to inhibit gastrointestinal activity as measured by the advancement of an inert charcoal meal in a given period of time. The reduction in gastrointestinal activity is proportional to the dosage. Toxicity or lethal dosage has been found to be safely in excess of the useful dosage range. They have only a slight effect as compared with atropine on vagal transmission and the cervical sympathetics. The effect on salivary flow is negligible as compared with atropine. They produce a substantial but transitory fall of blood pressure which is not inhibited by atropine blockage or by nicotine, or by tetraethyl ammonium chloride. From these facts it appears that the depressor response is not dependent upon transmission through the autonomic innervations and that the locus of action is principally on the cell directly.

The compounds also generally show anaesthetic activity when administered parenterally, some of them being more powerful i. e. giving a greater anaesthetic effect per unit of weight and a longer lasting anaesthetic effect than procaine.

I claim:
1. As a new product a compound of the general

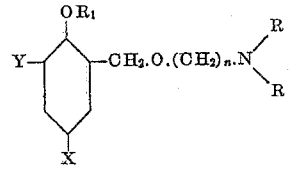

formula in which X stands for a member of the group consisting of chlorine and bromine, Y stands for a member of the group consisting of chlorine and bromine, $R_1$ is an alkyl group having from 1 to 6 carbon atoms, R and R stand for a member of the group consisting of two alkyl groups each having 1 to 4 carbon atoms and the group

and $n$ is a member of the group consisting of 2 and 3.

2. A new product as defined in claim 1 in which both X and Y are bromine atoms.

3. A new product as defined in claim 1 in which X and Y are both bromine atoms, both R's are ethyl groups, $R_1$ is a methyl group and $n$ is 2.

4. A new product as defined in claim 1 in which both X and Y are bromine atoms, both R's are butyl groups, $R_1$ is a methyl group and $n$ is 2.

5. A new product as defined in claim 1 in which both X and Y are chlorine atoms, both R's are ethyl groups, $R_1$ is a methyl group and $n$ is 2.

References Cited in the file of this patent
UNITED STATES PATENTS
2,397,799    Martin et al. _____ Apr. 2, 1946